United States Patent
Fillion et al.

(10) Patent No.: US 8,340,411 B2
(45) Date of Patent: Dec. 25, 2012

(54) SMART IMAGE RESIZING WITH COLOR-BASED ENTROPY AND GRADIENT OPERATORS

(75) Inventors: Claude S. Fillion, Rochester, NY (US); Vishal Monga, Webster, NY (US); Raja Bala, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 504 days.

(21) Appl. No.: 12/718,297

(22) Filed: Mar. 5, 2010

(65) Prior Publication Data

US 2011/0216968 A1   Sep. 8, 2011

(51) Int. Cl.
   *G06K 9/00*   (2006.01)

(52) U.S. Cl. ........ 382/163; 382/162; 382/167; 382/274; 382/263; 382/298

(58) Field of Classification Search .................. 382/162, 382/163, 164, 165, 166, 167, 254, 274, 263, 382/298, 190; 348/453, 445; 345/589, 593, 345/597, 660, 418

See application file for complete search history.

(56) References Cited

U.S. PATENT DOCUMENTS

| 7,382,915 | B2 | 6/2008 | Bala et al. |
| 2011/0206295 | A1* | 8/2011 | Tokunaga et al. ............. 382/298 |
| 2011/0229022 | A1* | 9/2011 | Yamada ........................ 382/162 |
| 2011/0235905 | A1* | 9/2011 | Yokokawa ..................... 382/165 |

OTHER PUBLICATIONS

Silavno Di Zenzo, A Note on the Gradient of a Multi-Image, Computer Vision, Graphics, and Image Processing 33, Jun. 14, 1985, IBM Rome Scientific Center, Via Del Giorgione 129, Rome, Italy.
Shai Avidan and Ariel Shamir, Seam Carving for Content-Aware Image Resizing, ACM Trans. 2007, Aug. 2007.

* cited by examiner

*Primary Examiner* — Ali Bayat
(74) *Attorney, Agent, or Firm* — Philip E. Blair; Fleit Gibbons Gutman Bongini & Bianco P.L.

(57) ABSTRACT

A system and method for resizing a digitally represented color image are presented. A color image with pixels defined by luminance and at least one chrominance value is received. For each pixel of the color image, a luminance spatial variation and respective chrominance spatial variations in the respective neighborhood of the each pixel are computed. The luminance spatial variation and the respective chrominance spatial variations are combined to produce a respective importance value for each pixel. Selected pixels are identified based upon their respective importance values and are removed by seam carving of the color image. The seam carving identifies seams of pixels based upon the respective importance values of pixels within the seams of pixels to create a resized color image. The resized color image is produced to an image output device.

18 Claims, 6 Drawing Sheets

SMART IMAGE RESIZING WITH COLOR-BASED ENTROPY AND GRADIENT OPERATORS

TECHNICAL FIELD

The present invention is directed to systems and methods for resizing digitally stored color images so as to retain visual information, and more particularly to determining image importance maps of color images.

BACKGROUND

Digital images are currently being captured by many different types of devices and there is a desire to display those images on a wide variety of electronic displays and printed outputs of many different sizes. Given the proliferation of image capture by digital photography and the variety of display types, such as mobile phones, Personal Digital Assistants, printers, and the like, image resizing occurs frequently. Historically, cropping and scaling, i.e., image down-sampling, have been used to shrink images, and scaling to achieve image upsampling has been used to enlarge images. Cropping is generally effective for shrinking images where there is only one region of interest in the image. Scaling by down-sampling works reasonably well for shrinking images containing low frequency information. However, scaling is able to introduce unwanted distortions because the scaling, and hence loss of image information, is applied uniformly to the image. With proper region identification, cropping may be more effective than naïve scaling in applications such as the generation of thumbnail images because the resultant images are more recognizable. However, naïve cropping may result in the cropping away of contextual information that is important to the viewer. To address the above described deficiencies of image resizing, content-aware resizing is used. The development of content-aware resizing techniques includes developing automated methods that can resize images by preserving the visual importance of image content.

Seam Carving is one content-aware, intelligent image resizing technique used to modify images to more effectively display that image at a different, such as a reduced, size. Seam carving techniques operate by identifying a connected path, or "seam" of pixels within an image that is characterized as having low importance or information content. The importance or image contribution of a particular pixel relative to its neighboring pixels is referred to herein as "entropy." Image resizing techniques that operate on color images to identify low entropy pixels operate on the luminance channel of the image. Such techniques are able to introduce distortions into image sections that are close to iso-luminant but that have different colors, since information from the chrominance channels is not considered in determining pixel entropy.

Accordingly, what is needed in this art are increasingly sophisticated systems and methods for determining color pixel entropy to support content aware, intelligent image resizing.

The following U.S. Patents, U.S. Patent Applications, and Publications are incorporated herein in their entirety by reference.

U.S. patent application Ser. No. 12/330,879, filed Dec. 9, 2008.

"*Seam Carving for Content-Aware Image Resizing*", by: Shai Avidan and Ariel Shamir, ACM Transactions on Graphics, Vol. 26, No. 3 (2007).

"*A Note On The Gradient Of A Multi-Image*", S. DiZenzo, Computer Vision, Graphics and Image Processing, 33:116-125 (1986).

"*Digital Color Imaging Handbook*", 1$^{st}$ Ed., CRC Press (2003), ISBN-13: 97808-4930-9007.

"*Control of Color Imaging Systems: Analysis and Design*", CRC Press (2009), ISBN-13: 97808-4933-7468.

BRIEF SUMMARY

A system and method for resizing a digitally represented color image are presented. A color image with pixels defined by luminance and at least one chrominance value is received. For each pixel of the color image, a luminance spatial variation and respective chrominance spatial variations in the respective neighborhood of the each pixel are computed. The luminance spatial variation and the respective chrominance spatial variations are combined to produce a respective importance value for the each pixel. Selected pixels are identified based upon respective importance values of the selected pixels and removed by seam carving of the color image. The seam carving identifies connected paths of pixels, which are sometimes referred to as "seams," based upon the respective importance values of pixels within the image to create a resized color image. The resized color image is produced to an image output device.

In one example embodiment, the present method for resizing a digitally represented color image performs the following: A color image to be resized is received. The received image includes a plurality of pixels each having a respective luminance and chrominance values. A luminance spatial variation for respective luminance values of pixels in a respective neighborhood of each pixel is computed for each pixel of the color image. Respective chrominance spatial variations for one or more respective chrominance values for each respective pixel in the respective neighborhood of each pixel is also computed. The luminance spatial variation and the one or more respective chrominance spatial variations are combined to produce a respective importance value for the each pixel. Selected pixels in the color image are identified based upon respective importance values of the selected pixels. Those selected pixels are removed from the color image. In one embodiment, the selected pixels are removed by seam carving of the color image. The seam carving includes identifying seams of pixels based upon the respective importance values of pixels within the seams of pixels to create a resized color image. The resized color image is provided to an image output device.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Presented is a method and system directed towards improved image resizing processing by using enhanced techniques to determine pixel importance or entropy to identify less important pixels that can be more effectively removed from an image to support image resizing. The present system and method performs content aware image resizing using importance maps that include image chrominance data in addition to luminance data. Content aware image resizing, such as is performed by seam carving techniques, is able to be partitioned into two stages. A first stage includes developing an "importance map" that quantifies the importance of each image pixel relative to surrounding pixels. A second stage includes applying a technique to selectively retain the pixels of higher interest in the resized image and therefore remove the pixels that were determined to have less importance. Advantageously, the present method extends the derivation of the entropy operator to comprehend variations in all color channels.

It should be understood that one of ordinary skill in this art would be readily familiar with many facets of image processing such as image resizing, operators such as gradient and entropy, importance maps, seam-carving techniques, and other algorithms common in the art of digital image resizing. Additionally, one of ordinary skill in this art would also be familiar with advanced mathematical techniques commonly used in this art. One of ordinary skill in this art would also be knowledgeable about computer science, software, and programming systems and methods sufficient to implement the functionality and capabilities described in detail herein in their own hardware environments without undue experimentation.

A "pixel", as used herein, refers to the smallest segment into which a printed image is divided and may also refer to a signal associated with a particular position in an image. Each pixel can be a bit in binary form, a gray scale value, or a set of coordinates in the color space of the image. Pixel values can be converted into CIELAB color space by a RGB to Lab converter to obtain luminance (L) and chrominance (a,b) values. Chrominance (a) is the chrominance of a first channel. Chrominance (b) is the chrominance of a second channel. Luminance (L) is the luminous intensity per unit area and can also represent a general tone measurement such as optical density, color difference, brightness/lightness, reflectance, or other measurements.

CIELAB is a color space specified by the Commission Internationale d'Eclairage (CIE) which describes all the colors visible to the human eye. It was created to serve as a device independent model to be used as a reference. The three coordinates of CIELAB represent the lightness of the color (L*, L*=0 yields black and L*=100 indicates diffuse white; specular white may be higher), its position between Red/Magenta and Green (a*, negative values indicate Green while positive values indicate Magenta) and its position between Yellow and Blue (b*, negative values indicate Blue and positive values indicate Yellow). The asterisk (*) after L, a and b are part of the full name, since they represent L*, a*, b*, to distinguish them from L, a, b. The L*a*b* model is a three-dimensional color model. It should be understood that a Lab color space is a color-opponent space with dimension L* for luminance and a* and b* for the color-opponent dimensions, based on non-linearly compressed CIEXYZ color space coordinates. Lab is now often used as an informal abbreviation for CIELAB.

The term "image resizing" is understood to mean both image enlargement and image reduction as is commonly known in the art of digital image resizing. The importance maps generated by the various operators known in the art of content aware image resizing can be used for both enlargement, i.e., to make all or a portion of an image larger, or for reduction, i.e., to make all or a portion of an image smaller, depending on the objectives of the image processing system.

An "image processing system" refers to any processing system which is involved with the resizing of a received digital image, as defined above. The image can be sent to any of a wide variety of devices known in the arts capable of receiving a digitized image. Such systems include production printers, xerographic devices, image reproduction equipment, photo-processing systems, and the like. Such devices include any device capable of generating, receiving, and/or outputting an image containing data points which, when rendered, produce the resized image as an output. Outputting an image means any form of image generation wherein the resized image is displayed, printed, stored, or transmitted.

A "printer" refers to any simple printing device, or complex multifunction device, that is capable of marking a media substrate such as paper, transparency, film, or any other output medium including memory and storage devices for data storage and subsequent retrieval. The set of such devices to which the present system and method are directed is intended to encompass a wide variety of digital document printers/copiers, book/magazine/newspaper and other digital printing presses, and other multi-function document reproduction systems. Such devices and systems generally include a display such as a CRT or touch screen along with one or more user interfaces such as a keyboard, mouse, keypad, touchpad, and the like, for entering data and configuring device-specific settings to optimize image quality and performance. Complex multifunction print devices that are likely to utilize the teachings hereof will incorporate the functionality of multiple photoreceptors, such as a separate photoreceptor for each of the four or more printed color components produced, a common intermediate belt to receive the toner image from each of the multiple photoreceptors, internal sensors for monitoring the common intermediate belt, and internal sensors for monitoring the photoreceptors. The internal sensors for monitoring the intermediate belt and those for monitoring the photoreceptors may or may not be the same sensors. One or more functions, features, or capabilities provided by a computer system or special purpose processor (such as an ASIC) designed to perform various aspects of the present method, as described more fully herein, may be integrated, in whole or in part, with any system or sub-system of such a multifunction device.

"Seam Carving" is a process of selectively retaining pixels of interest based on a pixel importance map to resize an image. Seam carving changes the size of an image by carving out or inserting pixels in different image regions. Seam carving is taught in the above-incorporated reference "Seam Carving for Content-Aware Image Resizing". As taught therein, a seam is a connected path of low energy pixels crossing the image from top to bottom or from left to right. By successively removing or inserting seams, the size of an image can be reduced or enlarged. For image reduction, seam selection ensures that more of the low energy pixels and fewer of high energy pixels are removed while preserving the image structure. For image enlarging, the order of seam insertion ensures a balance between image content and the artificially inserted pixels. Another process is row and column removal which is well known in this art. Other methods for image resizing (reduction or enlargement) can be used to resize a source image based on the hybrid importance map produced by an application of the present method.

Figure 6:
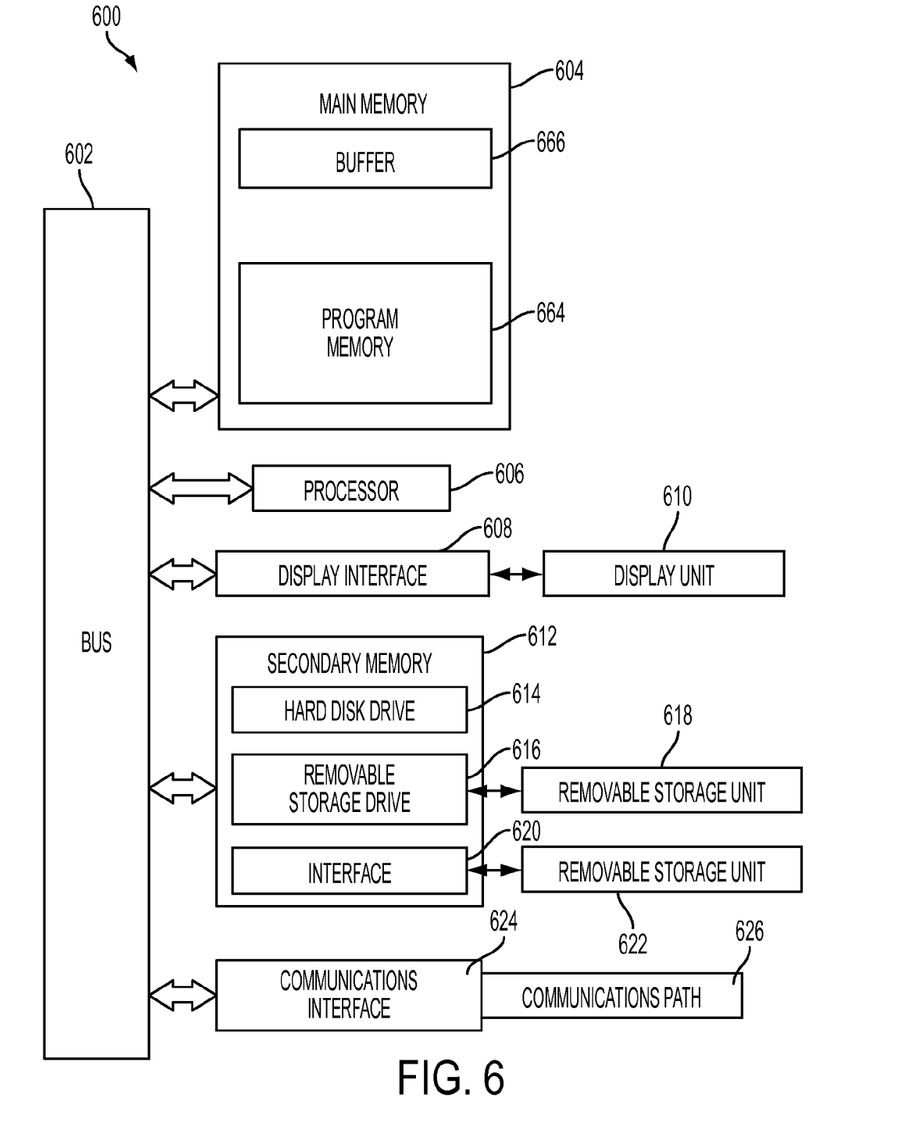
FIG. 6 illustrates a block diagram of one example embodiment of a special purpose computer useful for implementing one or more aspects of the present method.

A "module" designates a system component comprised of software or hardware, or a combination of both, which is designed to perform a given function. A plurality of modules may collectively perform a given function. A module may be implemented using a single software program comprising, at least in part, machine readable program instructions, or a single piece of hardware such as an ASIC, electronic circuit, or special purpose processing system such as is shown in FIG. 6. A plurality of modules may be executed by either a single computer system or a plurality of computer systems operating in parallel. Connections between modules (or "units") include both physical and logical connections. The term "system" includes one or more software and/or hardware modules which may further comprise an operating system, drivers, device controllers, and other apparatuses some or all of which may be connected via a network.

Embodiments of the present system and method for image resizing are directed towards a first stage of content aware image resizing. Such a first stage of content aware image resizing generally involves a determination of pixel importance values, or 'pixel entropy,' to identify less important pixels that can be removed from an image to support image resizing. Various embodiments hereof utilize different techniques to incorporate color information into pixel entropy determinations. One technique computes entropy measures for all three pixel data channels, e.g., one luminance channel and two chrominance channels, and uses a suitable technique to combine them. A second technique determines luminance data for each pixel and modifies those luminance values with filtered chrominance information to refine the entropy measurements that were determined based upon the luminance data. A third technique computes a true vector gradient, such as with a DiZenzo matrix, to compute color contrast upon which pixel entropy is determined.

A second stage of content aware image resizing, which is well known to practitioners of ordinary skill in the relevant arts and is beyond the subject of the teachings herein, includes methods known in this art for selectively retaining pixels of interest in the resized image having a higher importance and selectively removing pixels determined to have a lesser importance. Such techniques include seam carving techniques as are known by practitioners of ordinary skill. One example seam carving technique which incorporates importance map generation techniques is described in the above-referenced commonly owned and assigned U.S. patent application Ser. No. 12/330,879.

Figure 1:
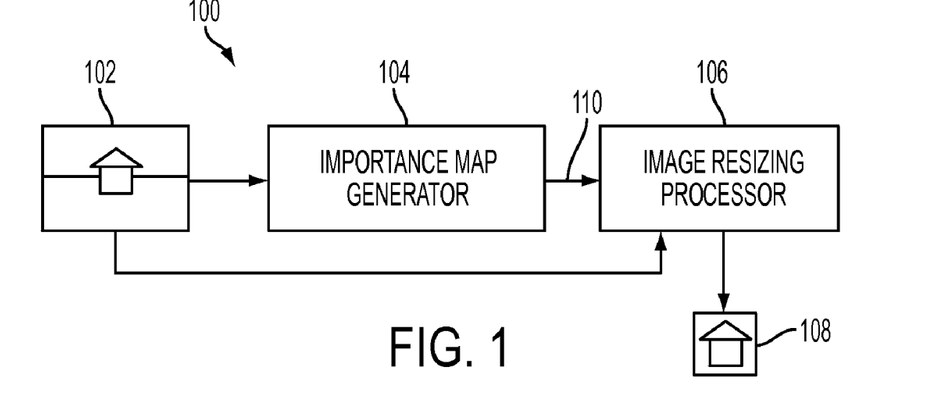
FIG. 1 illustrates an image processing data flow, in accordance with one embodiment of the present method.

Reference is now being made to FIG. 1 which illustrates an image processing data flow 100, in accordance with one embodiment of the present method.

An image 102 is provided to an importance map generator 104, which performs the processing described below to determine an importance map for the image. The importance map generator 104 determines an importance map 110 that is provided to an image resizing processor 106. The image resizing processor 106 of one embodiment receives both an importance map 110 and the original image 102. The image resizing processor 106 uses these received data sets to perform image resizing by any suitable technique based upon determined pixel importance maps as are generated by the importance map generator 104. In one embodiment, the image resizing processor implements a seam carving process such as is described in the above-incorporated U.S. application Ser. No. 12/330,879.

Figure 2:
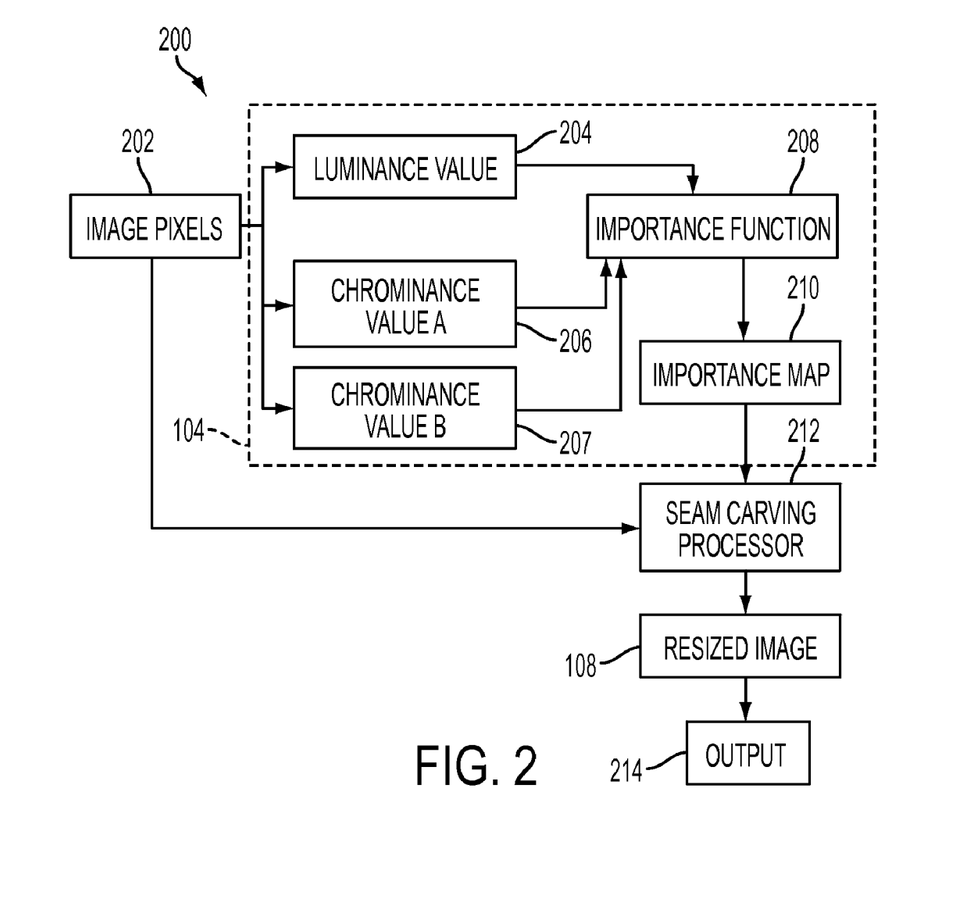
FIG. 2 illustrates a data flow diagram for an image resizing process utilizing chrominance importance map generation techniques, in accordance with one embodiment of the present method.

Reference is now being made to FIG. 2 which illustrates a data flow diagram 200 for an image resizing process utilizing chrominance importance map generation techniques, in accordance with one embodiment of the present method.

Data flow diagram 200 illustrates a set of image pixels 202 that constitute an input image, such as the input image 102 discussed above. Each pixel in the set of image pixels 202 has an associated luminance value 204 and two associated chrominance values 206, 207. In one embodiment, the luminance value 204 and two chrominance values are defined according to the CIE L*a*b* standard. In one embodiment, the received image 102 that was discussed above with regards to FIG. 1 has pixels defined by color information in a format other than a luminance and chrominance format. For example, pixel data is able to be specified according to a Red, Green and Blue (RGB) format, or pixel data is able to be specified in any other such format. The transformation from any other color format to a luminance and chrominance format, such as the CIE L*a*b* format, is known by practitioners of ordinary skill in the relevant arts.

Once the luminance value 204 and chrominance values 206, 207 are available for each pixel in the image pixels 202, the corresponding luminance value 204 and chrominance values 206, 207 for each pixel are provided to an importance function processor 208. The importance function processor 208 produces an importance map 210 that specifies an importance value of each pixel based upon the determined entropy of each pixel relative to other pixels in the neighborhood of that pixel. The processing performed by the importance function processor 208 of one embodiment is described in detail below. In one embodiment of the present method, the importance map 210 produced by the importance function 208 is provided, along with the image pixels 202, to a seam carving processor 212. The seam carving processor 212 creates a resized image 108 by removing selected pixels from the set of image pixels 202. The resized image 108 is then provided to an output 214, which is able to include, for example, a digital storage device, a data processing system, a printer, an electronic display, or other suitable output device.

Figure 3:
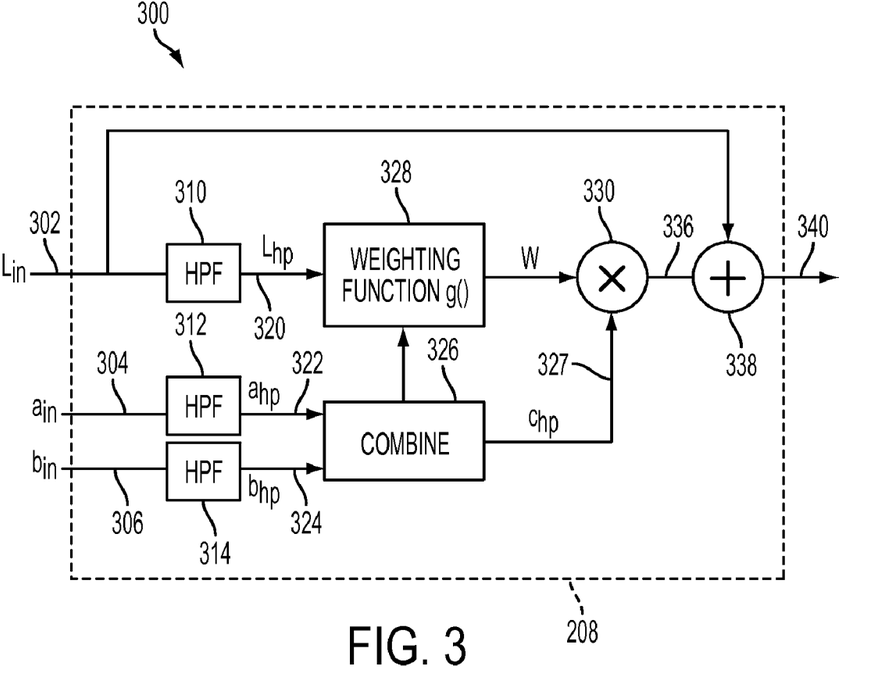
FIG. 3 illustrates calculation of an example importance function as illustrated in FIG. 2, in accordance with one embodiment of the present method.

Reference is next being made to FIG. 3 which illustrates calculation of an example importance function 300 as illustrated in FIG. 2, in accordance with one embodiment of the present method.

In FIG. 3, the example importance function 208 incorporates one of a number of possible importance functions that are used to determine image importance maps based upon pixel chrominance data in addition to pixel luminance data. In addition to the illustrated importance function of FIG. 3, further embodiments are able to utilize importance functions by, for example, computing entropy measures for the luminance values and both chrominance values of each pixel, and combining those three values according to a suitable function. Yet further embodiments are able to utilize importance functions that compute a true vector gradient using a DiZenzo matrix for computing color contrast and using the true vector gradient to compute entropy and the subsequent importance map. The DiZenzo matrix is described in the above-incorporated reference "*A Note On The Gradient Of A Multi-Image*".

In this example importance function 208, pixel data, including the luminance values 302, chrominance values "a" 304 and chrominance values "b" 306 of each pixel are sequentially provided to respective high pass filters. In particular, the luminance values 302 are provided to a luminance spatial high pass filter 310 that applies a spatial high pass filter to the luminance values of pixels to compute a high pass filtered luminance component $l_{hp}$ 320. The chrominance values "a" 304 and chrominance values "b" 306 of each pixel are respectively provided to respective chrominance spatial high pass filters, i.e., a first high pass filter 312 and a second high pass filter 314, to compute respective high pass filtered chrominance components including the high pass filtered "a" component $a_{hp}$ 332 and a high pass filtered "b" component $b_{hp}$ 324. This example importance function uses the above described high-pass filters to isolate information regarding luminance and chrominance edges in the image, which is where the color component spatial frequencies are the largest. The particular frequency cutoff and the particular filter used are able to be selected based upon, for example, the expected characteristics of the input image and the processor being used.

In one embodiment, the two high pass filtered chrominance components, components $a_{hp}$ 332 and $b_{hp}$ 324, of the image are then combined in a combiner 326 into a single data stream to produce a combined high pass filtered chrominance component $c_{hp}$ 327 that represents combined high-frequency chrominance information. Combiner 326 of one embodiment is able to calculate a Euclidean metric, e.g., $c_{hp}$ 327, that equals the square root of the sum of the squares of the values of $a_{hp}$ 332 and $b_{hp}$ 324. Further embodiments are able to lessen computational requirements by using a combiner 326 that calculates the computationally simpler 1-norm value of $c_{hp}$ 327, which equals the sum of the magnitudes of the values of $a_{hp}$ 332 and $b_{hp}$ 324.

In the illustrated example, $c_{hp}$ 327 is provided to a multiplier 330 and multiplied by a weight factor w that is a function of $l_{hp}$ 320 to produce a weighted high pass filtered chrominance component 336. The luminance values 302 are added, by an adder 338, to the weighted high pass filtered chrominance component 336 to produce a chrominance-weighted luminance component. In this example, the chrominance-weighted luminance component 340 is used to compute the pixel importance values. The formula used to calculate the weight factor w, denoted $w=g(l_{hp})$, in one embodiment is chosen with two criteria in mind: (1) to use the chrominance information only to enhance edges, and not to weaken them, and (2) to introduce the chrominance variation only at locations where the luminance variation is not sufficient to distinguish the local image variation. To satisfy the aforementioned two criteria, the chosen weighting function used by the example importance function is given by:

$$w=g(l_{hp})=\text{sign}(l_{hp})\bullet\text{sign}(c_{hp})\bullet f(|l_{hp}|)$$

where the sign-functions and the f-function deal with the first and second criteria, respectively.

In one embodiment, the first criterion is resolved using a "sign function" that is applied to $l_{hp}$ 320 and $c_{hp}$ 327. In one embodiment, sign(x) takes on a value of +1 when x is greater than or equal to zero, and −1 when x is less than zero. The sign(x) function is applied to the high-pass-filtered luminance component $l_{hp}$ 320 and the combined high pass filtered chrominance component $c_{hp}$ 327 at each pixel. Using such a function, the combined high-pass filtered chrominance information is used to modify the high pass filtered luminance information so as to only enhance the spatial luminance variation observed at each pixel relative to neighboring pixels. The polarity or sign of the high-pass chrominance component $c_{hp}$ 327 that is used as a correction to the high pass filtered luminance component $l_{hp}$ 320 is adjusted, via the sign functions, to match that of the high-pass filtered luminance component $l_{hp}$ 320. Specifically, before the high-pass-filtered chrominance component $c_{hp}$ 327 is used to modify the high pass filtered luminance component $l_{hp}$ 320, the high-pass-filtered chrominance component 327 is multiplied by both sign($l_{hp}$) and sign($c_{hp}$). This ensures that the high-pass-filtered chrominance information will have the same sign as the high-pass-filtered luminance information at an edge and therefore will only enhance the edge, rather than reduce it, when determining the importance value of pixels near that edge.

A number of functions may be used to resolve the second criterion, i.e., introduce the chrominance variation only in "areas" where the luminance variation is not sufficient to distinguish the local image variation and to properly reflect the importance of pixels in iso-luminant areas of an image. To achieve this, the amount of chrominance feedback is reduced when the luminance variation is large. Reducing the amount of chrominance feedback when the luminance variation is large is a conservative strategy that avoids excessive edge enhancement in regions that show sufficient detail. One embodiment uses a function $f(|l_{hp}|)$ that has a constant positive value for values of $|l_{hp}|$ that are below a pre-determined value B1. The value of $|l_{hp}|$ linearly decreases with a slope equal to "K" as the value of $|l_{hp}|$ increases from the value of B1 to a second pre-determined value B2. Parameters K, B1, and B2 control the amount of luminance edge enhancement as a function of the strength of the luminance edge in the original color image. The individual parameters of the function will depend on, for example, the desired sensitivity to chrominance variations in determining pixel importance. Moreover, many functions can be chosen that fulfill the desired characteristics of a monotonically non-increasing function.

Figure 4:
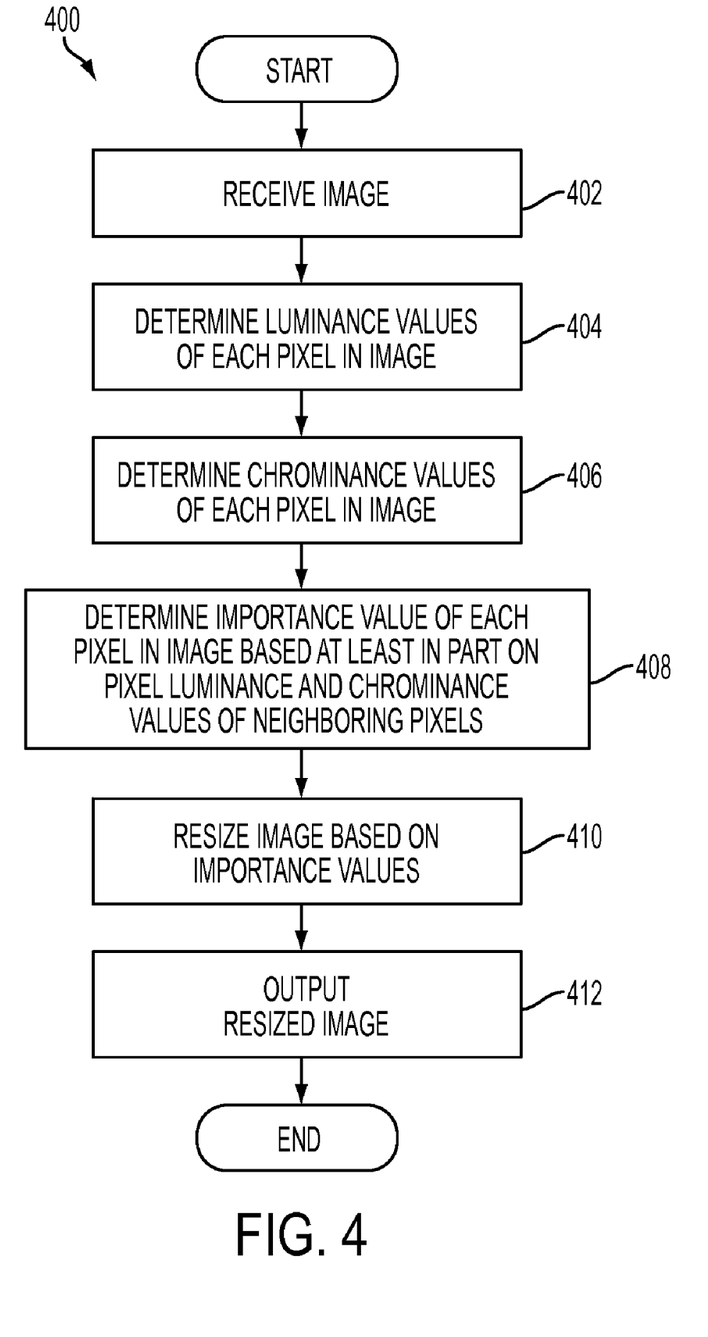
FIG. 4 is an image resizing flow diagram of one example embodiment of the present method for resizing a digitally represented color image.

Reference is now made to FIG. 4 which is an image resizing flow diagram 400 of one example embodiment of the present method for resizing a digitally represented color image.

At 402, a digitally represented color image is received. Such a color image can be received from suitable image input devices, as are widely known in the arts. Such devices are capable of receiving an image and/or converting an image into a digital representation thereof. Such image input devices include cameras, photography equipment, facsimile machines, and the like. Common examples are variations of the flatbed scanner, which are widely known in the arts, wherein specialized receptors move beneath a clear platen and scan the face of the document placed on the platen. A digital signal of the scanned document is generated which, in various embodiments, contains information about pixels such as color value, intensity, location, and the like, which collectively provide a digital representation of the document scanned. Such devices may be in communication with computer systems and workstations, memory and storage devices, networked platforms such as servers and client devices, and other devices. In various embodiments, the received digitally represented color image is able to be stored according to a variety of standards. For example, received digitally represented images are able to be stored in a Red, Green, Blue (RGB) format. Many formats are available to represent color images.

Various aspects of the processing flow, as described below, use digital color image representations that include a luminance value (L) received from a first channel and two chrominance values, represented below as values "a" and "b", received from one or more other channels. Luminance and Chrominance values are able to be derived from other image storage formats according to well known techniques. In one embodiment, the luminance and chrominance values are able to be represented according to the CIELAB standard, as is known to practitioners of ordinary skill in the relevant arts.

At step 404, luminance values are determined for each pixel in the received image. At step 406, chrominance values are determined for each pixel in the received image. Practitioners of ordinary skill in this art would readily appreciate the L*a*b* color space is a color-opponent space whose coordinates are given by {L*, a*, b*} with dimension L* for luminance and a* and b* for the color-opponent dimensions based on non-linearly compressed CIE XYZ color space coordinates. Luminance (L*) is a photometric quantity which, in essence, is the effect of radiance on our eyes. Chrominance (a*) is the chrominance of a first channel. Chrominance (b*) is the chrominance of a second channel. Radiance is the physical quantity related to light intensity, i.e., the power of the light spreading out in some solid angle over an area. Luminance is the integration of radiance weighted with a curve, which describes how efficiently different wavelengths of light trigger visual receptors in the eye. Brightness is the subjective visual experience of luminance, i.e., the effect of luminance on the brain. Conversion and transformations across differing color spaces are well established. Thus a further discussion for determining luminance and chrominance values for a given pixel has been omitted.

At step 408, an importance value of each pixel is determined. In various embodiments hereof, the importance value is based, at least in part, upon a the pixel's chrominance values relative to pixel chrominance values of neighboring pixels and the pixel's luminance values relative to pixel luminance values of neighboring pixels. In determining an importance value of a particular pixel, the luminance and chrominance values of neighboring pixels relative to the respective luminance and chrominance values of the particular pixel being evaluated are used to determine the importance value of the particular pixel being evaluated. As described below, one embodiment of the present method uses high pass filtered chrominance information to modify filtered luminance information to determine pixel importance values.

At step 410, the received image is resized based upon the determined importance values for each pixel. One embodiment performs image resizing by applying a seam carving technique to the image. Example seam carving techniques include identifying connected paths of pixels, which are sometimes referred to as "seams," based upon the respective importance values of pixels within the image.

At step 412, the resized is then provided to an image output device. An image output device, as used herein, refers to a device capable of rendering an image of a document. The set of image output devices includes digital document reproduction equipment and other xerographic systems, photographic production and reproduction equipment, including a wide variety of marking devices as are known in the arts. An inkjet printer is one example color marking device which renders an image from a received signal of the document image by the visual integration of color inks deposited onto a media. The term "rendering" is intended to be broadly interpreted. In one respect, rendering means reducing a signal of the image to a viewable form. In another, rendering means storing the image to a storage device, or communicating the image to a remote device over a network. A storage device refers to a device or system capable of storing images which have been resized in accordance with the methods disclosed herein. One embodiment of a storage device is a database, as are well known in the arts, placed in communication with a computer system, workstation, and/or server, that is either remote from or collocated with a device hosting a computing process that accesses and/or stores documents or images of document. Storage devices include RAM, ROM, Cache Memory, CD-ROM, DVD, flash drives, hard drives, and other volatile or non-volatile storage media.

Figure 5:
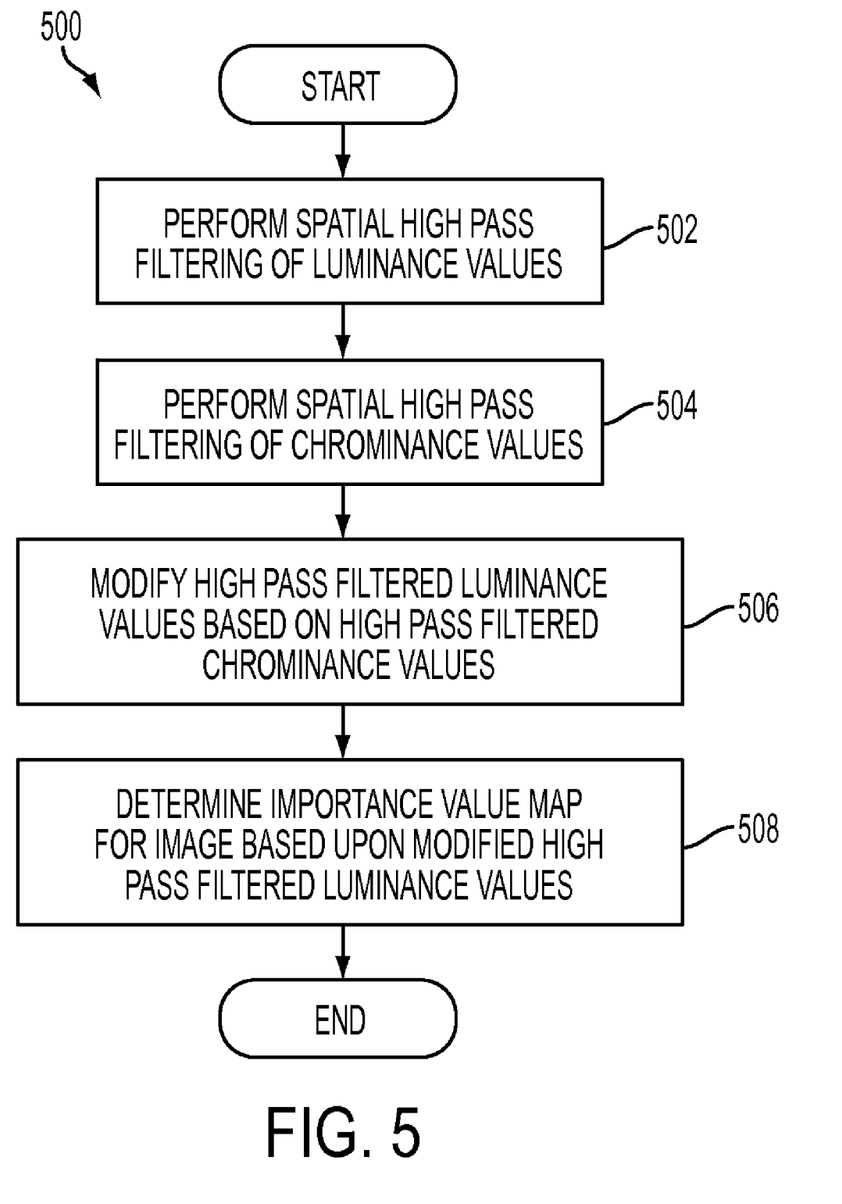
FIG. 5, illustrates an importance value determination process utilized by one embodiment of the image resizing flow diagram of FIG. 4.

Reference is now made to FIG. 5, which illustrates an importance value determination process 500 utilized by one embodiment of the image resizing flow diagram 400 of FIG. 4.

The importance value determination process begins by performing, at 502, spatial high pass filtering of the luminance values of a received image to determine spatial variations of the luminance values in the image. Luminance values are determined, for example, at 404 of FIG. 4, discussed above. The importance value determination process continues by performing, at 504, spatial high pass filtering of the chrominance values of a received image to determine spatial variations in the chrominance values in the image. Chrominance values are determined, for example, at 406 of FIG. 4, discussed above. In various embodiments, the two chrominance components, i.e., the "a" and "b" components, for each pixel of an image are sequentially processed by individual high pass filters and the output of those filters are combined, as is described above.

The process continues by modifying, at 506, the high pass filtered luminance values based upon the high pass filtered chrominance values. In various embodiments, a weighting function as is described above is utilized to determine the amount of modification to be applied to the high pass filtered luminance values. The processing continues by determining, at 508, an importance map for the image based upon the modified high pass filtered luminance values. The importance map is then used to resize the image in a manner as is more fully described in the above-incorporated U.S. application Ser. No. 12/330,879.

Figure 7:
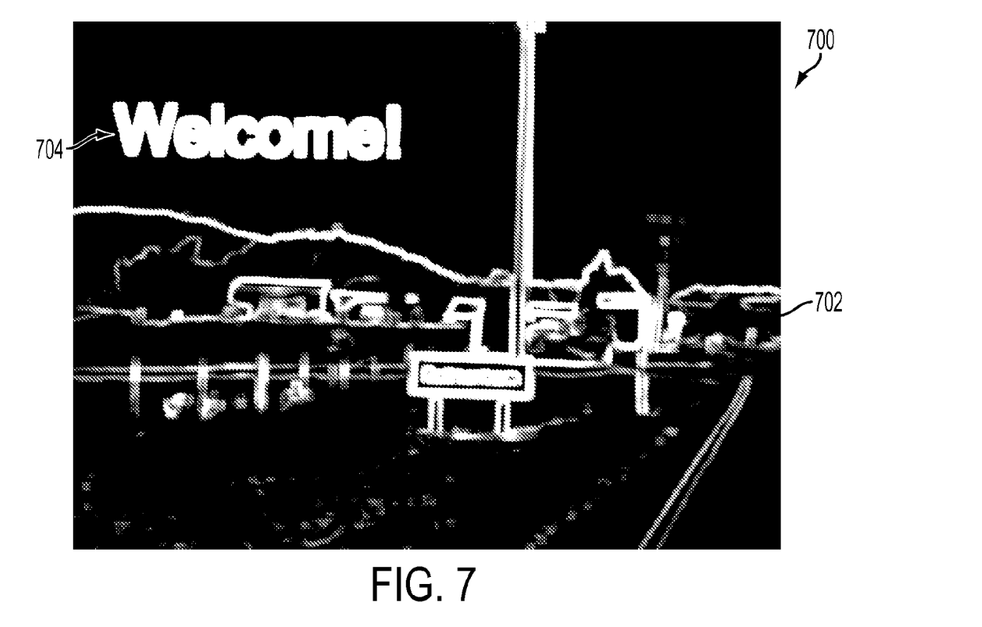
FIG. 7 illustrates a chrominance incorporating importance map generated by the above described method for a color image containing iso-luminant portions of different colors.

Reference is now made to FIG. 7, which illustrates a chrominance incorporating importance map 700 generated by the above described method for a color image containing iso-luminant portions of different colors. The chrominance incorporating importance map 700 depicts an image 702 that has the text "Welcome!" 704 in the upper left corner. In the color image from which this chrominance incorporating importance map 700 was generated, the text "Welcome!" 704 is in yellow and is placed against a blue sky background. The luminance values of the pixels creating the text "Welcome!" 704 are approximately equal to the luminance values of the blue sky background. The chrominance values of the pixels creating the yellow text "Welcome!" 704, however, are very different than the pixels of the blue sky background. Therefore, the chrominance incorporating importance map 700 created by the above described method clearly identifies the presence of the higher information entropy pixels creating the text "Welcome!" thereby allowing content aware image resizing methods using the chrominance incorporating importance map 700 to better preserve this text which appears on an iso-luminant background.

Figure 8:
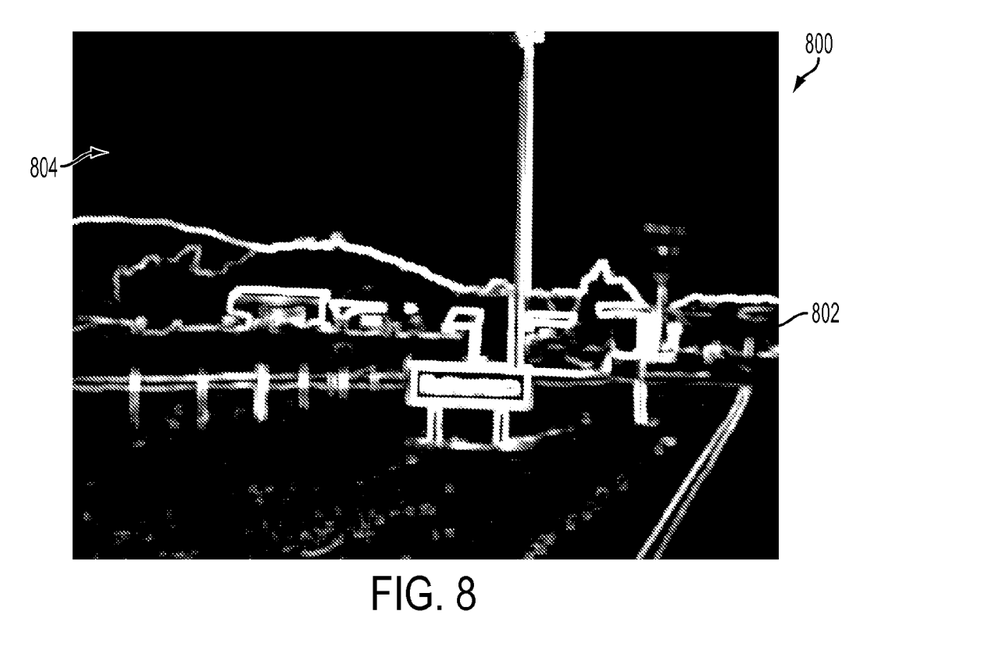
FIG. 8 illustrates a luminance only importance map generated by conventional means for a color image containing iso-luminant portions of different colors.

Reference is now made to FIG. 8, which illustrates a luminance-only importance map 800 generated by conventional means for a color image containing iso-luminant portions of different colors. The luminance-only importance map 800 was generated by conventional techniques that only use pixel luminance information, and not chrominance information, to determine pixel importance. This luminance-only importance map 800 was generated from the same color image as was used to generate the chrominance incorporating importance map 700 discussed above. It is noted that the upper left hand corner of the luminance only importance map 800 does not reflect the presence of the yellow "Welcome!" text that appears on a blue sky background. Because conventional importance map generation techniques do not evaluate pixel chrominance values, these two chrominance contrasting portions of the image are not reflected in the luminance only importance map 800. Content aware image resizing techniques that use the luminance only importance map 800 are likely to distort the yellow "Welcome!" text. The "Welcome!" text of the original image is likely to be distorted because the importance of pixels in that portion of the image, which have approximately the same luminance values but different chrominance values as surrounding pixels, are not reflected in the luminance only importance map 800.

Reference is now made to FIG. 6 which illustrates a block diagram of one example embodiment of a special purpose computer useful for implementing one or more aspects of the present method. Such a system could be implemented as a separate computer system, an electronic circuit, or an ASIC, for example. The nature of the implementation will depend on the processing environment wherein the present method finds its intended uses. The special purpose computer system would execute machine readable program instructions for performing various aspects of the embodiments described herein with respect to FIGS. 1-3 and the flow diagrams of FIGS. 4 and 5.

Special purpose computer system 600 includes processor 606 for executing machine executable program instructions for carrying out all or some of the present method. The processor is in communication with bus 602. The system includes main memory 604 for storing machine readable instructions. Main memory may comprise random access memory (RAM) to support reprogramming and flexible data storage. Buffer 666 stores data addressable by the processor. Program memory 664 stores machine readable instructions for performing the present method. A display interface 608 forwards data from bus 602 to display 610. Secondary memory 612 includes a hard disk 614 and storage device 616 capable of reading/writing to removable storage unit 618, such as a floppy disk, magnetic tape, optical disk, etc. Secondary memory 612 may further include other mechanisms for allowing programs and/or machine executable instructions to be loaded onto the processor. Such mechanisms may include, for example, a storage unit 622 adapted to exchange data through interface 620 which enables the transfer of software and data. The system includes a communications interface 624 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 626 which carries such signals and may be implemented using wire, cable, fiber optic, phone line, cellular link, RF, memory, or other means known in the arts.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein.

It should be understood that the flow diagrams presented herein are intended to be illustrative. Other operations may be added, modified, enhanced, or consolidated. Variations thereof are intended to fall within the scope of the appended claims.

It should be understood that one or more aspects of the present method are intended to be incorporated in an article of manufacture, including one or more computer program products. The article of manufacture may be included on a storage device that is readable by a compatible machine architecture, xerographic system, color management or other image processing system, any of which are capable of executing program instructions containing the present method. Such an article of manufacture may be shipped, sold, leased, or otherwise provided separately either alone or as part of an add-on, update, upgrade, download, or product suite by the assignee or a licensee hereof as part of a computer system, xerographic system, document processing system, image processing system, color management system, operating system, software program, plug-in, DLL, or a storage device.

It will be appreciated that the above-disclosed features and function and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for resizing a digitally represented color image, the method comprising:

receiving a color image to be resized, the received image comprising a plurality of pixels each having a respective luminance and chrominance values;

determining, by a processor, a respective importance value for each pixel in the received color image, each importance value for a given pixel being based upon luminance values and at least one chrominance value of pixels in a neighborhood of pixels surrounding the given pixel;

identifying selected pixels in the color image based upon respective importance values of the selected pixels;

removing selected pixels from the color image to create a resized color image, wherein removing the selected pixels comprises a seam carving of the color image, the seam carving comprising identifying connected paths of pixels based upon the respective importance values of pixels within the image; and providing the resized color image to an image output device.

2. The method of claim 1, wherein determining the respective importance value for each pixel comprises combining local entropy functions for the respective luminance values and local entropy functions for at least one of the respective chrominance values for a spatial sequence of neighboring pixels within the color image.

3. The method of claim 1, wherein determining the respective importance value for each pixel comprises combining computed vector gradients for the respective luminance values and the respective chrominance values.

4. The method of claim 1, wherein the at least one respective chrominance value comprises two respective independent chrominance values for each pixel of the color image, and determining the respective importance value is based upon a combination of values derived from each of the two respective independent chrominance values and the luminance value.

5. The method of claim 1, wherein determining the respective importance value for each pixel comprises:
  computing, for each pixel, a luminance spatial variation for the respective luminance values in the respective neighborhood of the each pixel;
  computing, for each pixel, respective chrominance spatial variations for each of at least one chrominance value for pixels in the respective neighborhood of the each pixel; and
  combining the luminance spatial variation and the respective chrominance spatial variations.

6. The method of claim 5,
  the computing the luminance spatial variation comprises applying a luminance spatial high pass filter to the luminance values of pixels in the respective neighborhood of the each pixel to compute a high pass filtered luminance component, and
  the computing the respective chrominance spatial variations comprises applying a respective chrominance spatial high pass filter to the at least one chrominance value to compute respective at least one high pass filtered chrominance components.

7. The method of claim 6, the determining the respective importance value for each pixel comprises:
  calculating a weighting factor based upon a magnitude of the high pass filtered luminance component;
  multiplying the weighting factor by a sign factor to create a signed weighting factor, wherein the sign factor comprises a negative value when a polarity of the respective at least one high-pass filtered chrominance components is opposite a polarity of the high-pass filtered luminance component, and the sign factor comprises a positive value when the polarity of the respective at least one high-pass filtered chrominance component is equal to the polarity of the high-pass filtered luminance component;
  weighting the respective at least one high pass filtered chrominance component by the signed weighting factor to produce a weighted at least one high pass filtered chrominance component;
  adding the weighted at least one high-pass-filtered chrominance component to the luminance values of pixels in the respective neighborhood of the each pixel to produce a chrominance-weighted luminance component; and
  computing the respective importance value for each pixel based upon the chrominance-weighted luminance component that corresponds to the each pixel.

8. The method of claim 7 wherein the computing the respective importance value for each pixel based upon the chrominance-weighted luminance component further comprises computing a local entropy function of the chrominance-weighted luminance component that that corresponds to the each pixel, and the respective importance value for each pixel is further based upon the local entropy function.

9. A system for resizing a digitally represented color image, the system comprising:
  a memory;
  a storage medium for storing data; and
  a processor in communication with said storage medium and said memory, said processor executing machine readable instructions for performing the method of:
    receiving a color image to be resized, the received image comprising a plurality of pixels each having a respective luminance and chrominance values;
    determining, by a processor, a respective importance value for each pixel in the received color image, each importance value for a given pixel being based upon luminance values and at least one chrominance value of pixels in a neighborhood of pixels surrounding the given pixel;
    identifying selected pixels in the color image based upon respective importance values of the selected pixels;
    removing selected pixels from the color image to create a resized color image, wherein removing the selected pixels comprises a seam carving of the color image, the seam carving comprising identifying connected paths of pixels based upon the respective importance values of pixels within the image; and
    providing the resized color image to an image output device.

10. The system of claim 9, wherein determining the respective importance value for each pixel comprises combining local entropy functions for the respective luminance values and local entropy functions for at least one of the respective chrominance values for a spatial sequence of neighboring pixels within the color image.

11. The system of claim 9, wherein determining the respective importance value for each pixel comprises combining computed vector gradients for the respective luminance values and the respective chrominance values.

12. The system of claim 9, wherein the at least one respective chrominance value comprises two respective independent chrominance values for each pixel of the color image, and determining the respective importance value is based upon a combination of importance values determined for the each pixel for each of the two respective independent chrominance values and the luminance value.

13. The system of claim 9, wherein determining the respective importance value for each pixel comprises:
  computing, for each pixel, a luminance spatial variation for the respective luminance values in the respective neighborhood of the each pixel;
  computing, for each pixel, respective chrominance spatial variations for each of at least one chrominance value for pixels in the respective neighborhood of the each pixel; and
  combining the luminance spatial variation and the respective chrominance spatial variations.

14. The system of claim 9,
  the computing the luminance spatial variation comprises applying a luminance spatial high pass filter to the luminance values of pixels in the respective neighborhood of the each pixel to compute a high pass filtered luminance component, and
  the computing the respective chrominance spatial variations comprises applying a respective chrominance spatial high pass filter to the at least one chrominance value to compute respective at least one high pass filtered chrominance components.

15. The system of claim 14, the determining the respective importance value for each pixel comprises:
   calculating a weighting factor based upon a magnitude of the high pass filtered luminance component
   multiplying the weighting factor by a sign factor to create a signed weighting factor, wherein the sign factor comprises a negative value when a polarity of the respective at least one high-pass filtered chrominance components is opposite a polarity of the high-pass filtered luminance component, and the sign factor comprises a positive value when the polarity of the respective at least one high-pass filtered chrominance component is equal to the polarity of the high-pass filtered luminance component;
   weighting the respective at least one high pass filtered chrominance component by the signed weighting factor to produce a weighted at least one high pass filtered chrominance component,
   adding the weighted at least one high-pass-filtered chrominance component to the luminance values of pixels in the respective neighborhood of the each pixel to produce a chrominance-weighted luminance component; and
   computing the respective importance value for each pixel based upon the chrominance-weighted luminance component that corresponds to the each pixel.

16. The system of claim 15 wherein the computing the respective importance value for each pixel based upon the chrominance-weighted luminance component further comprises computing a local entropy function of the chrominance-weighted luminance component that that corresponds to the each pixel, and the respective importance value for each pixel is further based upon the local entropy function.

17. A method for resizing a digitally represented color image, the method comprising:
   receiving a color image to be resized, the received image comprising a plurality of pixels each having a respective luminance value and respective at least one chrominance value;
   applying a luminance spatial high pass filter to the luminance values of pixels in a respective neighborhood of each pixel to compute a high pass filtered luminance component for the each pixel;
   applying a respective chrominance spatial high pass filter to the at least one chrominance value to compute respective at least one high pass filtered chrominance components for the each pixel;
   combining the high pass filtered luminance component and the respective at least one high pass filtered chrominance components to produced a respective importance value for the each pixel;
   identifying selected pixels in the color image based upon respective importance values of the selected pixels;
   removing selected pixels from the color image by seam carving of the color image, the seam carving comprising identifying seams of pixels based upon the respective importance values of pixels within the seams of pixels to create a resized color image; and
   providing the resized color image to an image output device.

18. The method of claim 17, further comprising:
   calculating a weighting factor based upon a magnitude of the high pass filtered luminance component;
   multiplying the weighting factor by a sign factor to create a signed weighting factor, wherein the sign factor comprises a negative value when a polarity of the respective at least one high-pass filtered chrominance components is opposite a polarity of the high-pass filtered luminance component, and the sign factor comprises a positive value when the polarity of the respective at least one high-pass filtered chrominance component is equal to the polarity of the high-pass filtered luminance component;
   weighting the respective at least one high pass filtered chrominance component by the signed weighting factor to produce a weighted at least one high pass filtered chrominance component;
   adding the weighted at least one high-pass-filtered chrominance component to the luminance values of pixels in the respective neighborhood of the each pixel to produce a chrominance-weighted luminance component; and
   computing the respective importance value for each pixel based upon the chrominance-weighted luminance component that corresponds to the each pixel.

* * * * *